US012565808B2

(12) United States Patent
Lin

(10) Patent No.: US 12,565,808 B2
(45) Date of Patent: Mar. 3, 2026

(54) SCREEN DEVICE

(71) Applicant: Taroko Door & Window Technologies, Inc., Giaoxiong City (TW)

(72) Inventor: Duwen Lin, Giaoxiong City (TW)

(73) Assignee: Taroko Door & Window Technologies, Inc., Giaoxiong City (CN)

(*) Notice: Subject to any disclaimer, the term of this patent is extended or adjusted under 35 U.S.C. 154(b) by 293 days.

(21) Appl. No.: 18/278,623

(22) PCT Filed: Mar. 2, 2021

(86) PCT No.: PCT/CN2021/078589
§ 371 (c)(1),
(2) Date: Aug. 24, 2023

(87) PCT Pub. No.: WO2022/183357
PCT Pub. Date: Sep. 9, 2022

(65) Prior Publication Data

US 2024/0133238 A1 Apr. 25, 2024
US 2024/0229555 A9 Jul. 11, 2024

(51) Int. Cl.
*E06B 9/54* (2006.01)

(52) U.S. Cl.
CPC .......... *E06B 9/54* (2013.01); *E06B 2009/543* (2013.01)

(58) Field of Classification Search
CPC ............................. E06B 9/54; E06B 2009/543
See application file for complete search history.

(56) References Cited

U.S. PATENT DOCUMENTS 1,121,898 A * 12/1914 Davis ........................ E06B 9/68 160/267.1
3,158,195 A * 11/1964 Ney .......................... E06B 9/54 160/265
(Continued)

FOREIGN PATENT DOCUMENTS

CA 2581744 C * 9/2011 ............... E06B 9/54
CN 205206539 U * 5/2016
(Continued)

*Primary Examiner* — Johnnie A. Shablack
(74) *Attorney, Agent, or Firm* — Che-Yang Chen

(57) ABSTRACT

A screen device includes a cylinder body, a movable frame and two first frame materials, wherein the cylinder body and the movable frame are disposed between the two first frame materials, and a rolling bar is disposed in the cylinder body; a screen is disposed between the rolling bar and the movable frame, and at least one rotating member is disposed in the cylinder body; at least one pull line penetrates the movable frame, and at least one end of the pull line penetrates the first frame material to extend into the cylinder body, and is then combined to the rotating member; the rotating member is disposed on a side portion of the cylinder body, and therefore, the rotating member can be adjusted and controlled only by using a tool on the side portion of the cylinder body, so as to adjust and control the tightness of the pull line when needed. The process thereof is completely free from blockages caused by any component, and adjustment and control is really convenient.

8 Claims, 10 Drawing Sheets

(56) References Cited

U.S. PATENT DOCUMENTS

| | | | | | |
|---|---|---|---|---|---|
| 3,386,489 | A * | 6/1968 | Denton | A47K 3/38 | 160/322 |
| 6,059,007 | A * | 5/2000 | Tomita | E06B 9/54 | 160/264 |
| 6,463,983 | B1 * | 10/2002 | Lang | E06B 9/54 | 160/273.1 |
| 6,629,555 | B2 * | 10/2003 | DeBlock | E06B 9/54 | 160/31 |
| 6,938,666 | B1 * | 9/2005 | Ulriksen | E06B 9/62 | 160/31 |
| 7,322,395 | B2 * | 1/2008 | Nyffenegger | E06B 9/54 | 160/310 |
| 7,673,666 | B2 * | 3/2010 | Fan | E06B 9/262 | 160/381 |
| 7,694,711 | B2 * | 4/2010 | Okachi | E06B 9/58 | 160/245 |
| 7,730,926 | B2 * | 6/2010 | Moriya | E06B 9/36 | 160/84.06 |
| 7,861,761 | B2 * | 1/2011 | Martineau | E06B 9/54 | 160/31 |
| 7,967,345 | B2 * | 6/2011 | Davies | E06B 9/54 | 292/37 |
| 8,656,978 | B2 * | 2/2014 | Goldenberg | E06B 9/58 | 160/31 |
| 8,905,468 | B2 * | 12/2014 | Kitani | B60J 3/0204 | 160/265 |
| 9,689,201 | B2 * | 6/2017 | Riemelmoser | E06B 9/42 | |
| 10,294,718 | B2 * | 5/2019 | Hicks | E06B 9/54 | |
| 11,105,148 | B2 * | 8/2021 | Shipman | E06B 9/42 | |
| 2001/0042346 | A1 * | 11/2001 | Brioschi | E06B 9/54 | 49/447 |
| 2005/0098276 | A1 * | 5/2005 | Agliolo Quartalaro | E06B 9/54 | 160/276 |
| 2010/0012282 | A1 * | 1/2010 | Franklin | E06B 9/54 | 160/371 |
| 2019/0017318 | A1 * | 1/2019 | Smith | E06B 9/42 | |
| 2019/0301242 | A1 * | 10/2019 | Shipman | E06B 9/50 | |
| 2020/0408037 | A1 * | 12/2020 | Roberts | E06B 9/90 | |
| 2024/0133238 | A1 * | 4/2024 | Lin | E06B 9/42 | |
| 2024/0229555 | A9 * | 7/2024 | Lin | E06B 9/58 | |

FOREIGN PATENT DOCUMENTS

| | | | | |
|---|---|---|---|---|
| CN | 210508995 | U * | 5/2020 | |
| KR | 20060115789 | A * | 11/2006 | E06B 9/54 |
| KR | 20120003479 | U * | 5/2012 | E06B 9/54 |
| KR | 101206002 | B1 * | 11/2012 | E06B 9/54 |
| KR | 101533198 | B1 * | 7/2015 | E06B 9/54 |
| KR | 101540658 | B1 * | 7/2015 | E06B 9/56 |
| KR | 101598002 | B1 * | 3/2016 | E06B 9/54 |
| KR | 101839468 | B1 * | 3/2018 | E06B 9/56 |
| KR | 101883409 | B1 * | 7/2018 | E06B 9/54 |
| KR | 20200092071 | A * | 8/2020 | E06B 9/42 |
| KR | 102211245 | B1 * | 2/2021 | E06B 3/964 |
| KR | 20220001788 | U * | 7/2022 | E06B 9/80 |
| TW | I708888 | B * | 11/2020 | E06B 9/54 |
| WO | WO-2010034156 | A1 * | 4/2010 | E06B 9/54 |

* cited by examiner

SCREEN DEVICE

TECHNICAL FIELD

The present invention relates to a screen device, in particular to a screen device capable of being positioned anywhere.

BACKGROUND ART

In home or office places, in order to achieve the purpose of shading sun, sheltering or preventing outdoor mosquitoes and flying dust from entering the indoor space, for most of the buildings, a screen device is provided at an opening thereof. The current screen device is substantially classified into a flat screen and a hidden screen. However, because the current hidden screen achieves a number of functions such as sheltering and storage at the same time, the flat screen device has been gradually replaced with the current hidden screen.

According to the most common hidden screen at present, a rolling bar is mainly used to roll up a mesh. Then, by pulling a movable rod in the screen structure, the mesh is pulled out, so as to achieve the effects of shading sun and sheltering, etc. Even more, a plurality of pull lines and a pull line adjusting and controlling apparatus are additionally disposed in the structure of the commonly used hidden screen. The pull line passes through the movable rod. The pull line adjusting and controlling apparatus is used to adjust and control the tightness of the pull line so that the movable rod and the mesh in the hidden screen can be positioned anywhere. Although the commonly used hidden screen can reach expected functions, the following problems are caused in use.

Firstly: The pull line adjusting and controlling apparatus in the commonly used hidden screen is mounted on the inner side of a frame body, as illustrated in the China Taiwan invention patent No. 1684422. The inner side of the frame body is usually a path for unfolding or storing the screen and the movable frame. Thus, for the commonly used hidden screen, when a tool is enabled to stretch into the pull line adjusting and controlling apparatus to adjust the pull line, the operation is often hindered by the screen or the movable frame, causing inconvenient adjustment. The problem becomes more obvious when the width of the screen is larger.

Secondly: When the frame material of the commonly used hidden screen is assembled, an additional pneumatic or electric tool is usually needed for cooperation. Then, the commonly used hidden screen can be completely assembled. However, when the commonly used hidden screen is used in an environment where an electric or inflatable device is not supplied, because of power depletion or insufficient air pressure of the tool, the progress of a project is impeded.

Thirdly: The cylinder body of the rolling bar in the commonly used hidden screen is usually assembled on an outer frame by means of bolts. Thus, in a case that the cylinder body of the rolling bar needs to be removed when the commonly used hidden screen is maintained or cleaned, it is necessary to unscrew screwed components with a tool, then the cylinder body of the rolling bar can be removed, so not only the human cost is high, but also disassembling is inconvenient.

Fourthly: Moreover, when the commonly used hidden screen is used on opening of a large-width building, a rolling bar with a large rolling force is usually configured to roll up the large-area screen or movable frame. Such a structural configuration usually leads to that the unfolded screen moves because of the large rolling force from the rolling bar. The problems of leakage of light, reduced shielding or the situation that the outdoor mosquitoes and flying dust cannot be prevented from entering the indoor space or the like occur to the commonly used hidden screen easily.

SUMMARY OF THE INVENTION

The present invention mainly aims to dispose a mechanism for adjusting pull lines on the outer side of a cylinder body of a rolling bar, so when it is needed to adjust and control the tightness of the pull line, it is only needed to operate on the outer side of the cylinder body of the rolling bar with a tool; there is no hindering of any component in the process, thus, the problem that adjustment is inconvenient in the commonly used technology can be eradicated, and the adjustment and control procedure is not limited by the width of a screen.

The present invention also mainly aims to dispose convex ribs and corresponding embedding grooves thereof on an assembled structure of frame materials; in a mode that the convex rib and the embedding groove are assembled to each other, the frame material can be assembled fast and conveniently, and can also be fast assembled by clamping and fixing without the cooperation of a tool, and then the situation that when operation is performed in an environment where an electric or inflatable device is not supplied in the commonly used technology, the progress of a project is delayed or impeded is eradicated.

The present invention further mainly aims to additionally dispose a mounting member between the cylinder body and an outer frame, a hooking part on the mounting member is combined with a hook-in part of the cylinder body, so that the cylinder body can be disassembled and assembled without the cooperation of any tool, and then the disassembling and assembling convenience can be improved.

The present invention still further mainly aims to dispose a positioning bar in a movable frame, the tail end of the positioning bar abuts against the adjacent frame material, so that an unfolded screen and the movable frame cannot be pulled back under a larger rolling force of the rolling bar, thus the problems of leakage of light, reduced shielding or the situation that the outdoor mosquitoes and flying dust cannot be prevented from entering the indoor space or the like of the commonly used hidden screen can be alleviated.

According to the technical solution of the present invention, a screen device includes a cylinder body, a movable frame and two first frame materials, where the cylinder body and the movable frame are disposed between the two first frame materials, and a rolling bar is disposed in the cylinder body; a screen is disposed between the rolling bar and the movable frame, and at least one rotating member is disposed in the cylinder body; at least one pull line penetrates the movable frame, and at least one end of the pull line penetrates the first frame material to extend into the cylinder body, and is then combined to the rotating member.

A screen device includes a cylinder body, a movable frame and two first frame materials, where the cylinder body and the movable frame are disposed between the first frame materials, and a rolling bar is disposed in the cylinder body; a screen is disposed between the rolling bar and the movable frame, a mounting base is disposed in the movable frame, a swing member and at least one slider are accommodated in the mounting base, the slider is provided with an ejecting bar in the direction of facing the swing member, and one end of the ejecting bar is able to resist the swing member.

A screen device includes a cylinder body, a movable frame and two first frame materials, where the cylinder body and the movable frame are disposed between the first frame materials, and a rolling bar is disposed in the cylinder body; a screen is disposed between the rolling bar and the movable frame, and the cylinder body can be assembled to one of an outer frame or an adjacent wall by means of a plurality of mounting members.

DETAILED DESCRIPTION

Figure 1:
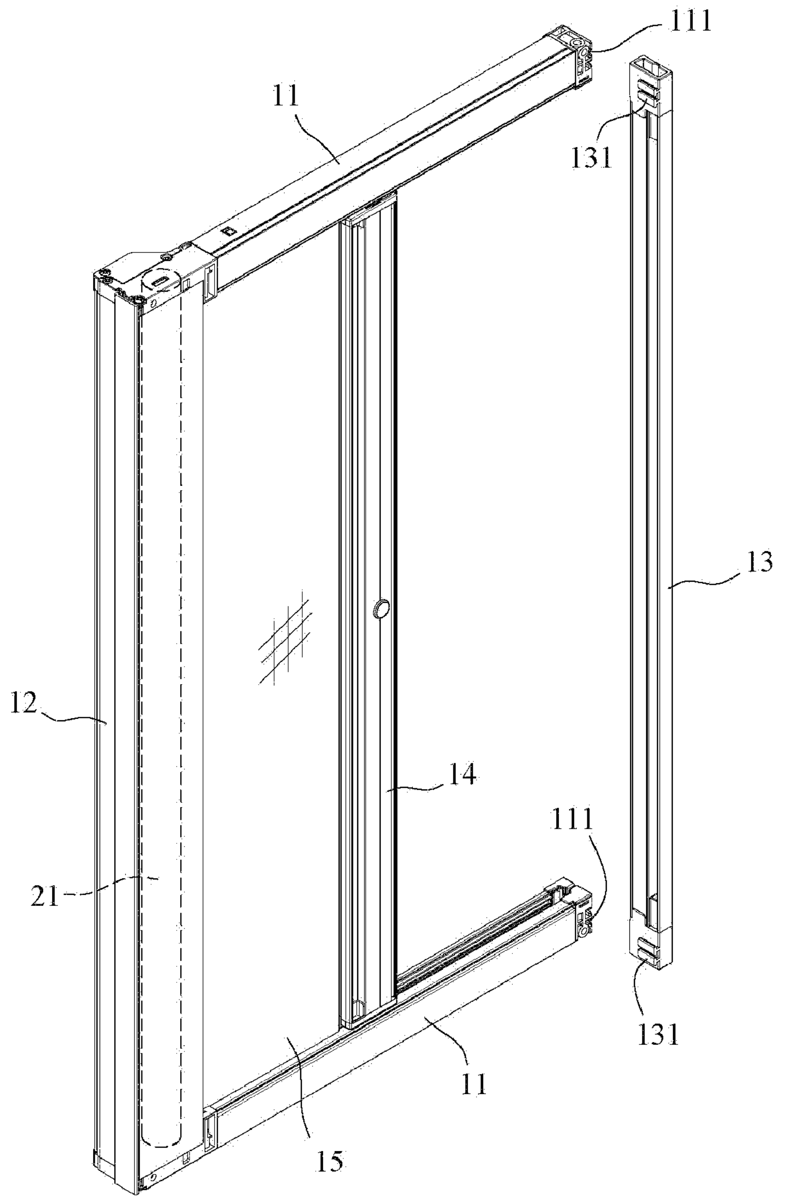
FIG. 1 is a schematic exploded view of a first preferable embodiment of the present invention.

Please refer to FIG. 1, it is a first preferable embodiment of a screen device of the present invention, including two first frame materials 11, a cylinder body 12 disposed at one end of the first frame material 11, a second frame material 13 disposed on the side of the first frame material 11 opposite to the cylinder body 12, a movable frame 14 disposed between the first frame materials 11, and a screen 15 connected between the movable frame 14 and the cylinder body 12. The positions of the second frame material 13 adjacent to the first frame materials 11 are respectively provided with a plurality of convex ribs 131, and the positions of the first frame material 11 relative to the convex ribs 131 of the second frame material 13 are provided with a plurality of corresponding embedding grooves 111. In a mode that the convex rib 131 and the embedding groove 111 are assembled with each other, in addition to the rapid combination of the first frame material 11 and the second frame material 13, when assembling work is performed under the environment where no electric or inflatable device is supplied, this embodiment can also be assembled by quick clamping and fixing without the cooperation of a tool, and the situation that the progress of a project is delayed is avoided. What's more, in this embodiment, the two first frame materials 11 can be set to different heights, so that one of the frame materials 11 can be configured on the ground in a low-track manner.

Figure 2:
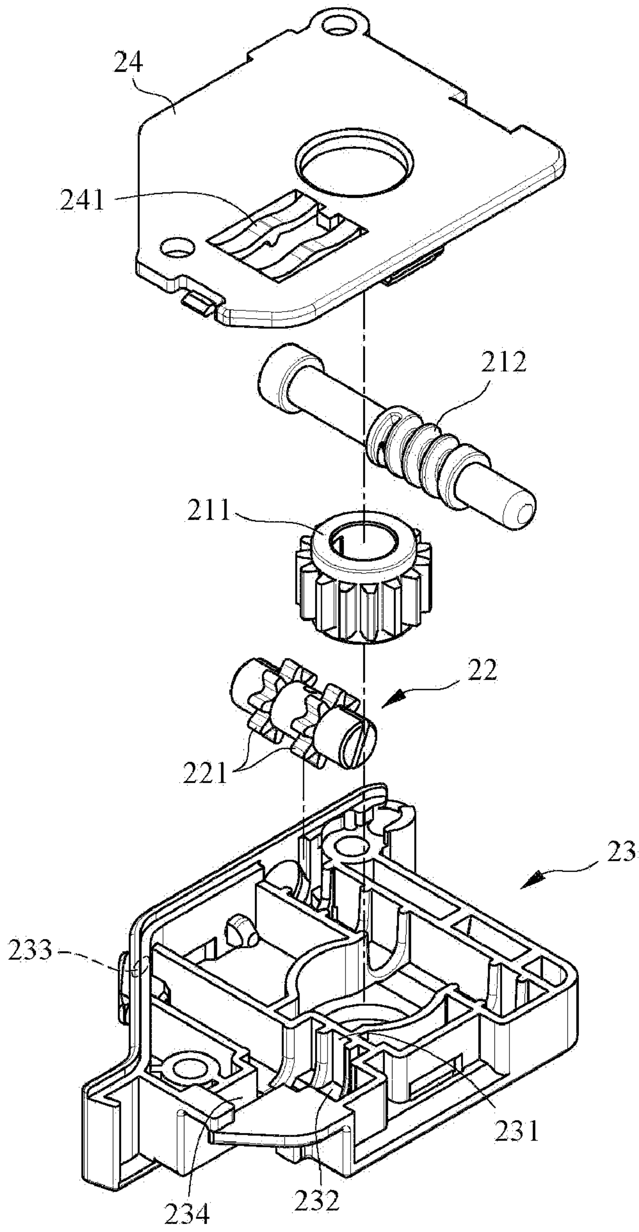
FIG. 2 is an exploded view of a cylinder body in the first preferable embodiment of the present invention.
Figure 3:
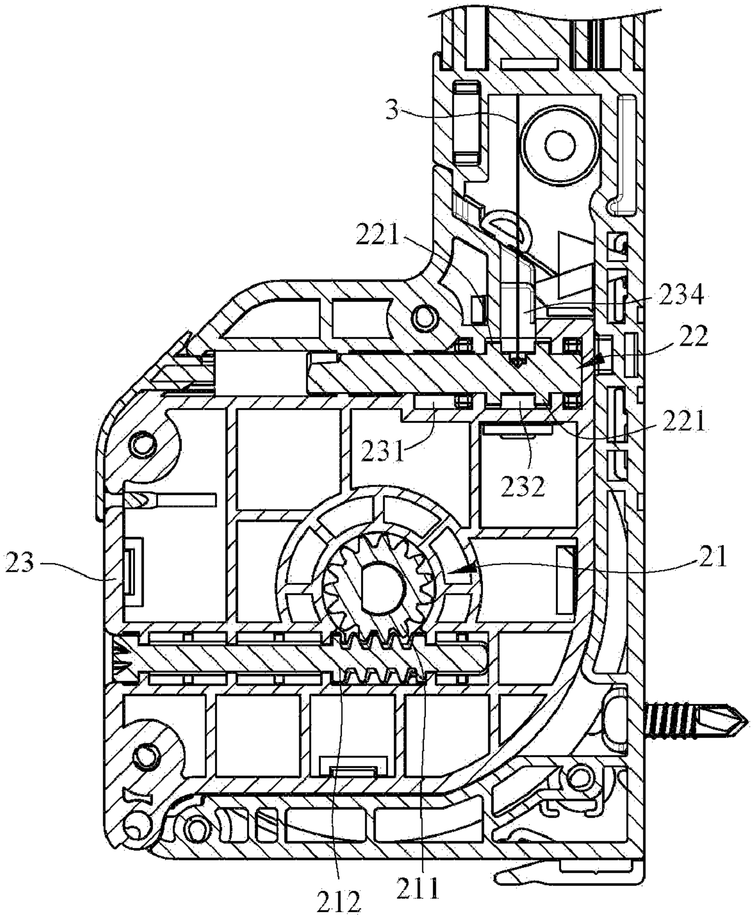
FIG. 3 is a cross-sectional view of the cylinder body in the first preferable embodiment of the present invention.

Referring to FIG. 1 to FIG. 3, a rolling bar 21 for rolling up the screen 15, two rotating members 22 respectively at two opposite ends of the cylinder body 12, two cover bodies 23 respectively adjacent to the first frame materials 11, and two cover plates 24 respectively covering the cover bodies 23 are disposed in the cylinder body 12. It is to be noted first that since the same mechanism is disposed at the two opposite ends of the cylinder body 12, for ease of illustration, FIG. 2 and FIG. 3 are illustrated only with the mechanism configuration at one of the ends. The cover body 23 is provided with a pivoting groove 231, a transparent and hollow part 232 spaced apart from the pivoting groove 231, a via hole 233 directed toward the pivoting groove 231, and an aperture 234. The rotating member 22 is pivotally disposed in the pivoting groove 231 and is annularly provided with two axially spaced tooth parts 221. The position of the transparent and hollow part 232 corresponds to the position of the tooth part 221 of the rotating member 22, and the position of the cover plate 24 relative to the tooth part 221 is provided with two elastic stopping members 241, which are used to produce a stopping effect of limiting step by step during rotation of the tooth part 221.

Figure 4:
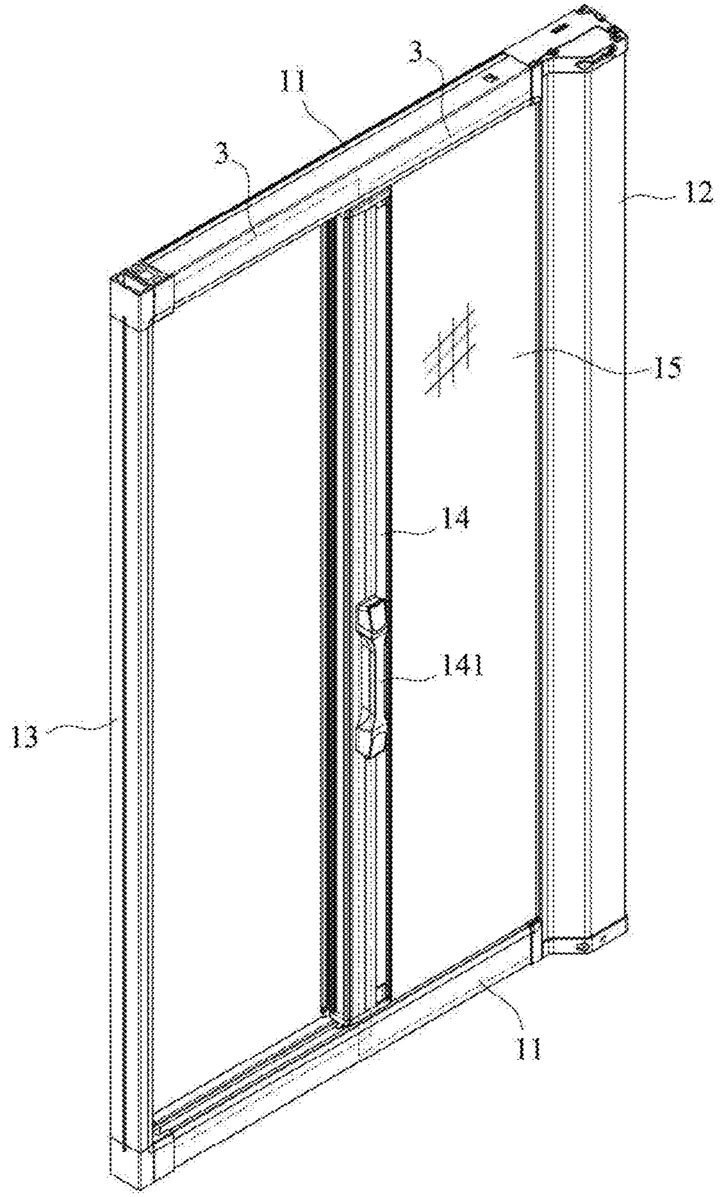
FIG. 4 is a three-dimensional view after assembling is completed in the first preferable embodiment of the present invention.

Please refer to FIG. 3 and FIG. 4, two pull lines 3 penetrate the movable frame 14 and a handle 141 for holding and pulling is disposed. One end of each pull line 3 is fixed to the position of the first frame material 11 adjacent to the second frame material 13. The other end of each pull line 3 penetrates the movable frame 14 and is staggered in the movable frame 14, and then penetrates the end portion of the movable frame 14 to reach the first frame material 11 and enters the cylinder body 12, and then penetrates the corresponding cover body 23 respectively through the aperture 234 of the cylinder body 12 on the same side as the first frame material 11, and thus is combined to the rotating member 22 disposed in the pivoting groove 231 of the cover body 23. One end of the rolling bar 21 extends into the cylinder body 12, and the rolling bar 21 extending into the cover body 12 is sleeved with a gear 211, and the gear 211 is engaged with a worm 212. When the pull line 3 is too loose or too tight, operation can reach the rotating member 22 by means of a tool via the via hole 233. The elastic stopping member 241 is disposed at the position of the cover plate 24 relative to the tooth part 221 of the rotating member 22. When the rotating member 22 rotates, the elastic stopping member 241 can produce a stopping effect of limiting step by step on the tooth part 221. Thus, by means of the rotating member 22, the tightness of the pull line 3 is adjusted, it is avoided that because the tension of the pull line 3 is too small or too large, the movable frame 14 deflects, and the function of positioning the movable frame 14 anywhere can be ensured. In addition, when the screen 15 is too loose or too tight, by means of the worm 212, during rotation, the gear 211 can be driven, and the rolling bar 21 is rotated. Thus, the screen 15 is adjusted to has a proper tension, in addition to that the flatness of the screen 15 is ensured, the screen 15 can also be rolled on the rolling bar 21.

Referring to FIG. 2 to FIG. 4 again, it is worthy of being noted that since the mechanism for adjusting the pull line 3 is assembled on the cover body 23, the cover body 23 is disposed on the outer side of the cylinder body 12, thus, when it is needed to adjust and control the pull line 3, the rotating member 22 can be adjusted and controlled just by penetrating the via hole 233 of the cover body 23 through a tool. Since there is no hindering of any component in the adjustment and control process, the problem of unsmooth adjustment is solved, and the situation that adjustment and control are inconvenient when a screen device is large in width is avoided.

Figure 5:
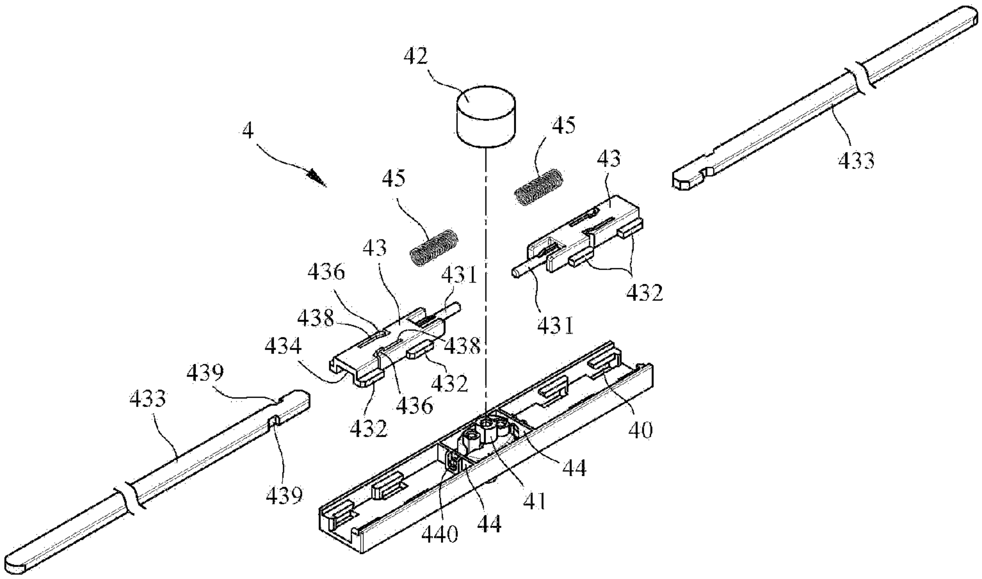
FIG. 5 is an exploded view of a second preferable embodiment of the present invention.

Please refer to FIG. 5 in combination with FIG. 4, as shown in FIG. 5, it is a second preferable embodiment of a screen device of the present invention, the second preferable embodiment differs from the first preferable embodiment in that a mounting base 4 is disposed in the movable frame 14, a swing member 41, a rotary knob 42 disposed on the swing member 41, two sliders 43 respectively disposed on two opposite sides of the swing member 41, two baffles 44 respectively disposed between the swing member 41 and the slider 43, and two elastic members 45 respectively disposed between the baffle 44 and the slider 43 are accommodated in the mounting base 4. The rotary knob 42 is disposed at the handle 141 of the movable frame 14.

Further, the slider 43 is provided with an ejecting bar 431 facing the swing member 41, at least one slide rail 432 disposed on the side, a positioning bar 433 extending towards an opening at one end of the movable frame 14, an inserting groove 434 opposite to the positioning bar 433, and two elastic buckles 436 respectively disposed on two opposite sides. The baffle 44 is provided with a through hole 440 so that one end of the ejecting bar 431 can resist the swing member 41 by means of the through hole 440. The position of the mounting base 4 relative to the at least one slide rail 432 is provided with a slide groove 40, one end of the slide groove 40 is provided with a stopping part 401 so that the at least one slide rail 432 can be disposed and the slider 43 can slide back and forth within a specific range in the direction of the slide groove 40.

The positioning bar 433 located in the inserting groove 434 is provided with two hook grooves 439 located on two opposite sides. The positions of the slider 43 relative to the hook grooves 439 are provided with two notches 438. The elastic buckler 436 is disposed at the position of the slider 43 facing the notch 438. Thus, the positioning bar 433 is respectively connected to the slider 43 in a mode that the positioning bar 433 is clamped to the notch 438 by means of the elastic buckle 436, and the positioning bar 433 can also correspondingly move along with that the slider 43 slides back and forth.

Figure 6:
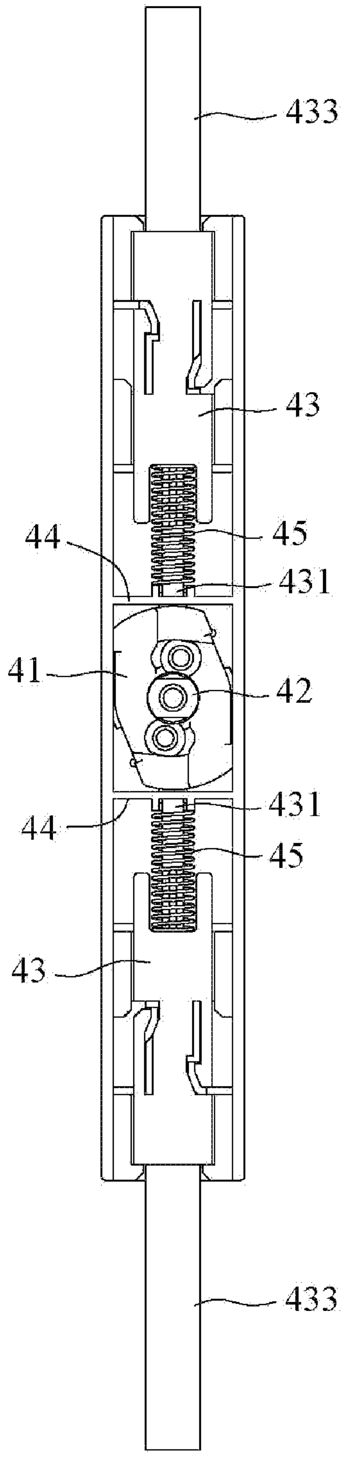
FIG. 6 is a schematic view of the second preferable embodiment of the present invention in a normal state.
Figure 7:
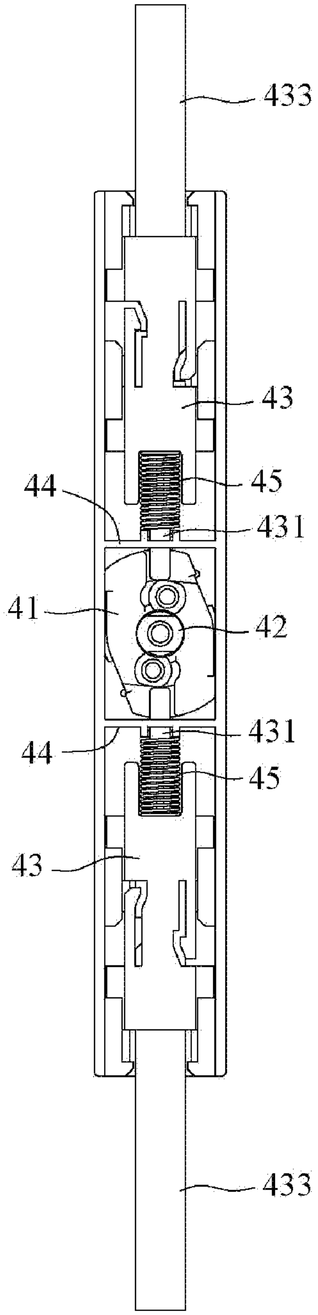
FIG. 7 is a schematic view I of actuation of the second preferable embodiment of the present invention.
Figure 8:
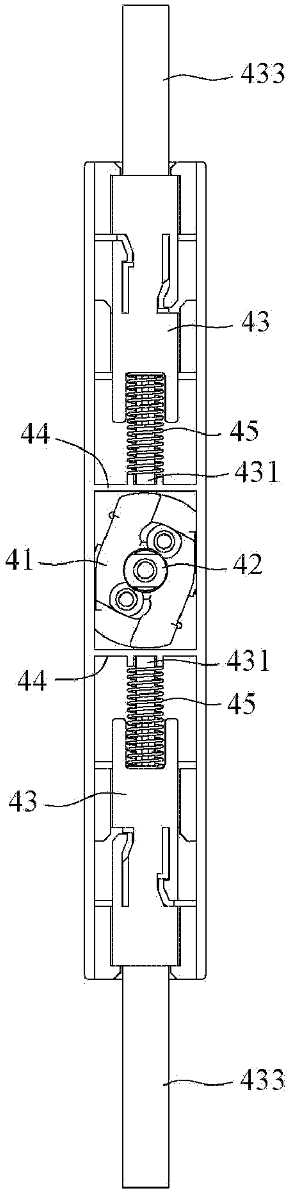
FIG. 8 is a schematic view II of actuation of the second preferable embodiment of the present invention.
Figure 9:
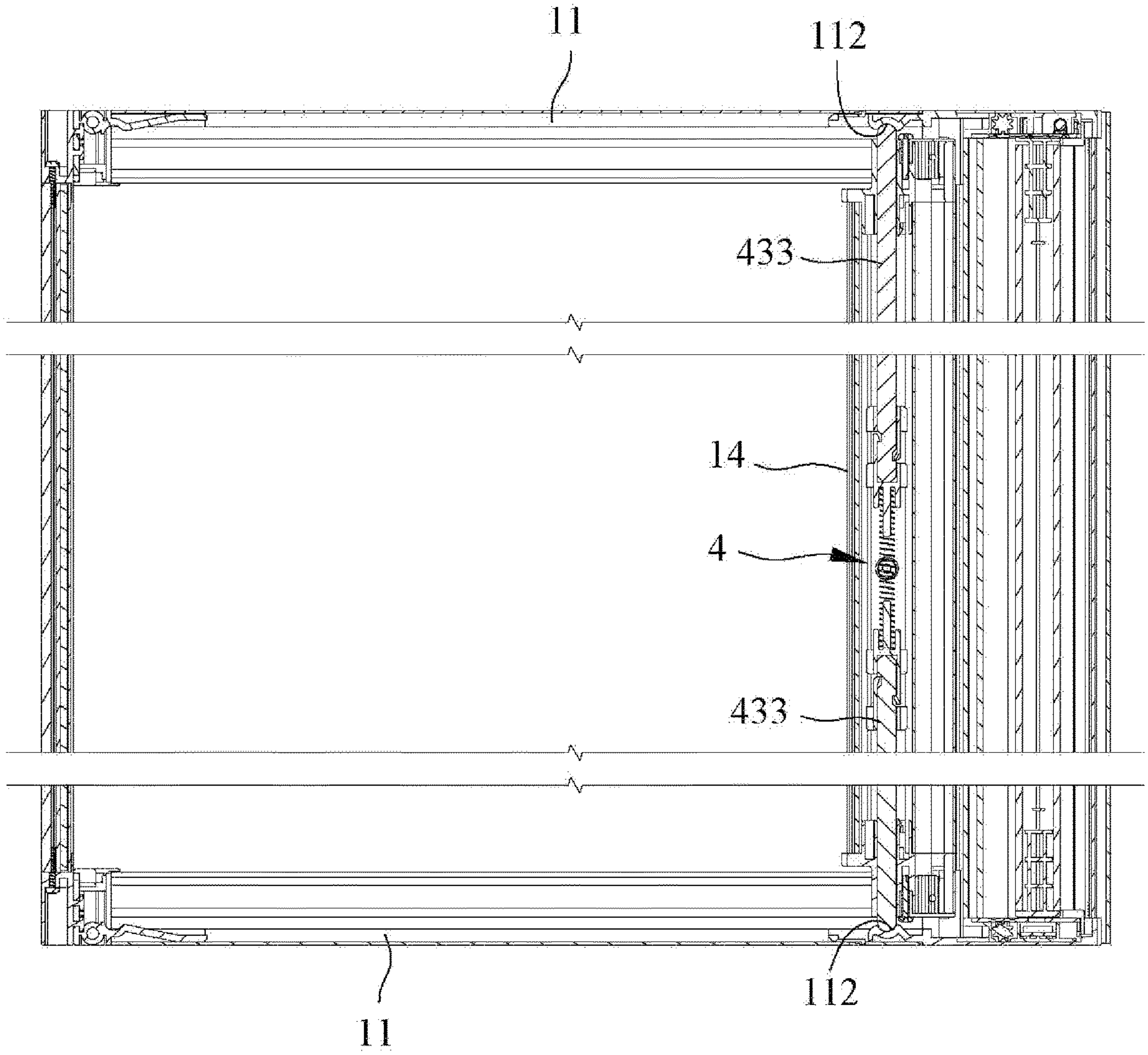
FIG. 9 is a schematic view of a positioning bar abutting against a positioning recess in the second preferable embodiment of the present invention.

Referring to FIG. 6 to FIG. 9, the swing member 41 is provided with a cam structure with the two sides respectively corresponding to the ejecting bar 431, the position of each of the first frame materials 11 relative to the corresponding positioning bar 433 is provided with a positioning recess (112) (as shown in FIG. 9), so as to resist and limit the corresponding positioning bar 433. As shown in FIG. 6, in a normal state, the positioning bar 433 connected to the slider 43 does not abut against the positioning recess 112, so the movable frame 14 can be freely pulled between the first frame materials 11. Further as shown in FIG. 7, in a case that the movable frame 14 is pulled again, when the positioning bar 433 is in contact with the protruding edge of the positioning recess 112, the positioning bar 433 is ejected up by the protruding edge, and the slider 43 slides to the swing member 41. The ejecting bar 431 also stretches into the swing member 41, and the elastic member 45 is compressed at the same time so as to accumulate an elastic restoration force. Then as shown in FIG. 8, after the positioning bar 433 enters the positioning recess 112 by passing through the protruding edge, the slider 43 is pushed in a reverse direction by the elastic restoration force of the elastic member 45, and then the positioning bar 433 is driven, so that the positioning bar 433 is completely ejected and resisted in the positioning recess 112. Then, the rotary knob 42 is rotated and the swing member 41 is enabled to rotate synchronously, so that the cam structure of the swing member 41 is enabled to eject and resist one end of the ejecting bar 431, and the slider 43, the ejecting bar 431 and the positioning bar 433 are limited between the positioning recess 112 and the swing member 41. Then the movement of the movable frame 14 is limited. Thus, when the large-width screen device is implemented, the positioning bar 433 can be pressed against the positioning recess 112, so that the movable frame 14 cannot be pulled back under the rolling force of the rolling bar 21.

Figure 10:
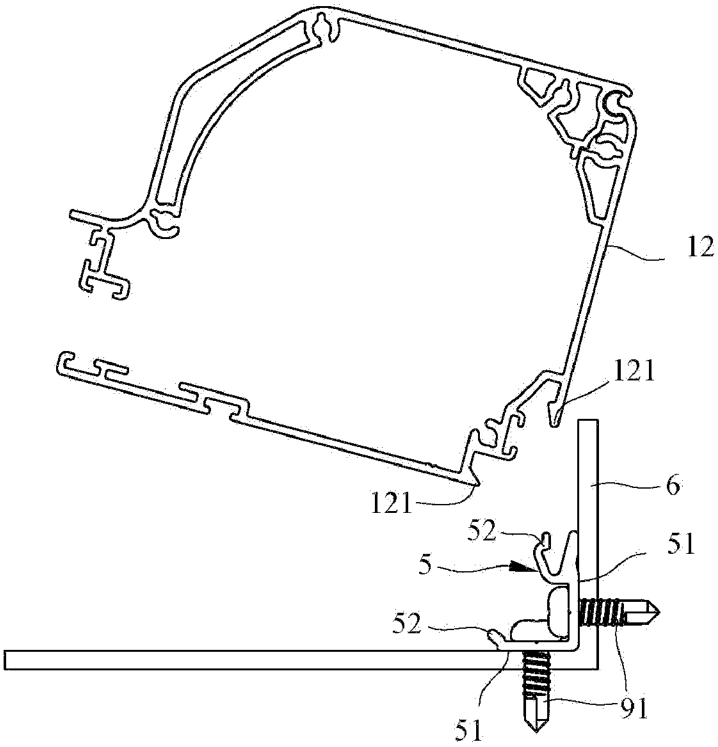
FIG. 10 is a schematic view of a third preferable embodiment of the present invention.

Please refer to FIG. 10, it is a third preferable embodiment of a screen device of the present invention, the third preferable embodiment differs from the first preferable embodiment and the second preferable embodiment in that the cylinder body 12 can be assembled on one of an outer frame 6 or an adjacent wall through a plurality of mounting members 5 (only one is shown in FIG. 10). In this third preferable embodiment, the case where the cylinder body 12 is detachably mounted on the outer frame 6 is illustrated. Each mounting member 5 is provided with two combining parts 51 and two hooking parts 52 respectively extending outwards from the combining part 51. The combining part 51 is fixedly disposed on the inner edge surface of the outer frame 6 by means of a plurality of screws 91. Each hooking part 52 is specifically a clamp-in groove. The positions of the cylinder body 12 relative to the hooking parts 52 are provided with two hook-in parts 121. Each hook-in part 121 is specifically a clamping hook so as to be combined with the clamp-in groove. Thus, the operation process that the cylinder body 12 is mounted on the outer frame 6 is fast completed, the labor cost is reduced and the assembling time is shortened. During maintaining or cleaning, the cylinder body 12 can also be removed without cooperation of any tool, and the beneficial effect of improving the disassembling and assembling convenience is achieved.

In summary, the cylinder body 12 of the present invention is detachably mounted on the outer frame 6. Since the rolling bar 21 is disposed in the cylinder body 12. The rotating member 22, compared with the prior art, is also appropriately integrated and disposed in the cylinder body 12. The rolling bar 21 is appropriately stored, and the purpose of simplified integration of essential mechanisms with the pull line adjusting function and the switch function is achieved. In a case that the basis functions of pulling, positioning and locking are achieved, it is more beneficial to additionally design the allowance needed for other functions, and the potential value of searched and developed products is effectively improved. Thus, the purpose of the present invention can actually be achieved.

The above description is only preferable embodiments of the present invention, and cannot be constructed as limiting the implementation scope of the present invention. Simple equivalent changes or modifications made on the basis of the range of the present invention and the content of the description all fall within the scope of the present invention.

What is claimed is:

1. A screen apparatus, comprising:

a cylinder body;

a movable frame;

two first frame materials, wherein the cylinder body and the movable frame are disposed between the two first frame materials;

a rolling bar disposed in the cylinder body;

a screen disposed between the rolling bar and the movable frame;

at least one rotating member disposed in the cylinder body; and at least one pull line penetrating the movable frame, wherein at least one end of the pull line penetrates the first frame material to extend into the cylinder body, and is then combined to the rotating member;

wherein the position of the cylinder body adjacent to the first frame material is provided with a cover body, a pivoting groove is provided in the cover body, and the rotating member is pivotally disposed in the pivoting groove;

wherein a plurality of tooth parts are annularly disposed on the rotating member, and the position of the cover body relative to the tooth part is provided with a transparent and hollow part.

2. The screen apparatus according to claim 1, wherein a cover plate is further disposed on the cover body, and the cover plate is provided with at least one elastic stopping member relative to the tooth part.

3. The screen apparatus according to claim 1, wherein the position of the cover body facing the pivoting groove is provided with a via hole.

4. A screen apparatus, comprising:

a cylinder body;

a movable frame;

two first frame materials, wherein the cylinder body and the movable frame are disposed between the two first frame materials;

a rolling bar disposed in the cylinder body;

a screen disposed between the rolling bar and the movable frame;

at least one rotating member disposed in the cylinder body; and at least one pull line penetrating the movable frame, wherein at least one end of the pull line penetrates the first frame material to extend into the cylinder body, and is then combined to the rotating member;

wherein a second frame material is further comprised between the first frame materials, and the second frame material is located on the opposite side to the cylinder body; the position of the second frame material adjacent to the first frame material is provided with at least one convex rib, and the first frame material is provided with an embedding groove relative to the convex rib of the second frame material.

5. A screen apparatus, comprising:

a cylinder body;

a movable frame;

two first frame materials, wherein the cylinder body and the movable frame are disposed between the first frame materials;

a rolling bar disposed in the cylinder body;

a screen disposed between the rolling bar and the movable frame;

at least one rotating member disposed in the cylinder body;

at least one pull line penetrating the movable frame, wherein at least one end of the pull line penetrates the first frame material to extend into the cylinder body, and is then combined to the rotating member;

a mounting base disposed in the movable frame; and a swing member and at least one slider accommodated in the mounting base, wherein the slider is provided with at least one slide rail, the slider is provided with an ejecting bar in the direction of facing the swing member, and one end of the ejecting bar is able to resist the swing member, wherein the slider is provided with a positioning bar extending toward an opening at one end of the movable frame.

6. The screen apparatus according to claim 5, wherein the position of the slider relative to the positioning bar is provided with an inserting groove, the positioning bar located in the inserting groove is provided with at least one hook groove, the position of the slider relative to the hook groove is provided with a notch, and the position of the slider facing the notch is provided with an elastic fastener.

7. The screen apparatus according to claim 6, wherein one end in the slide groove is provided with a stopping part.

8. The screen apparatus according to claim 5, wherein the position of the first frame material relative to the positioning bar is provided with at least a positioning recess.

* * * * *